United States Patent Office 3,241,944
Patented Mar. 22, 1966

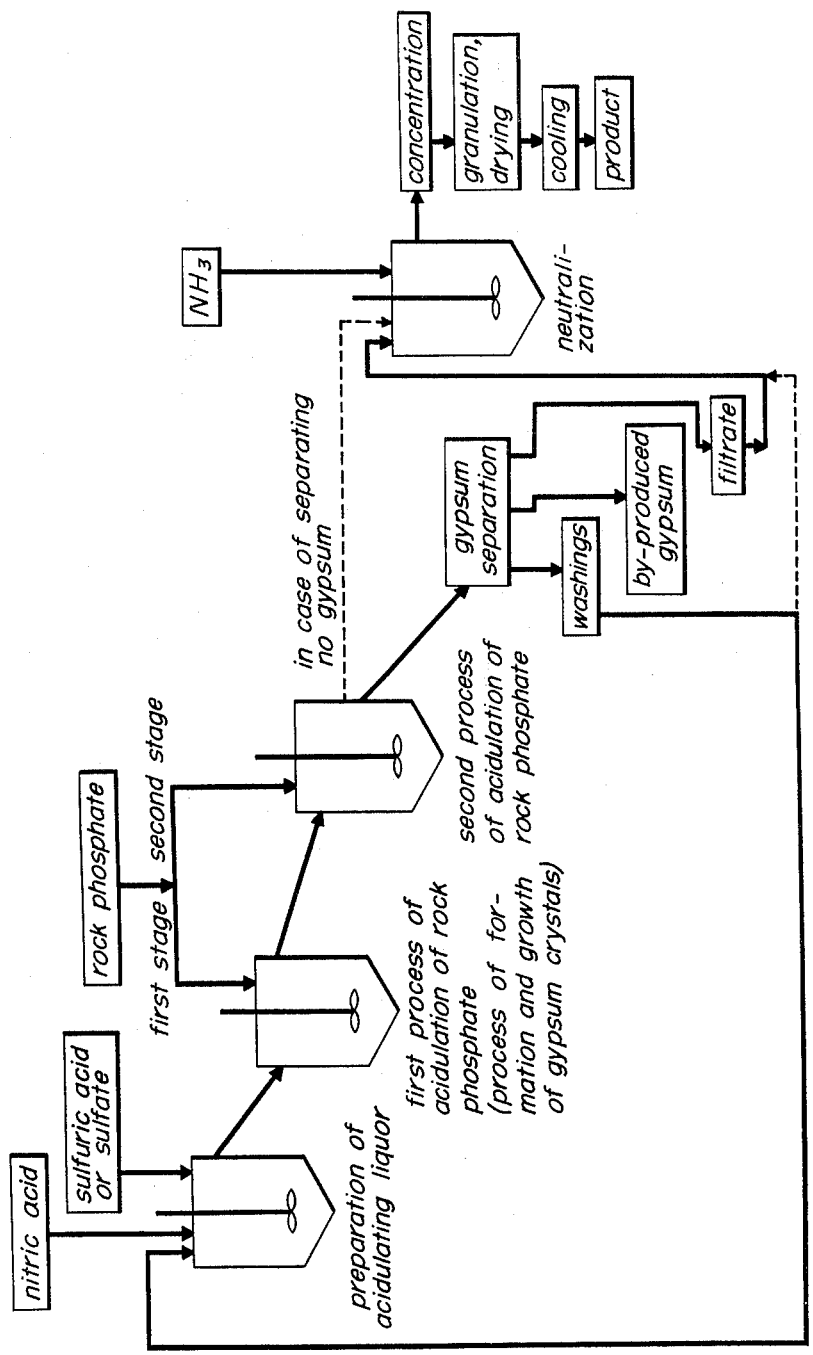

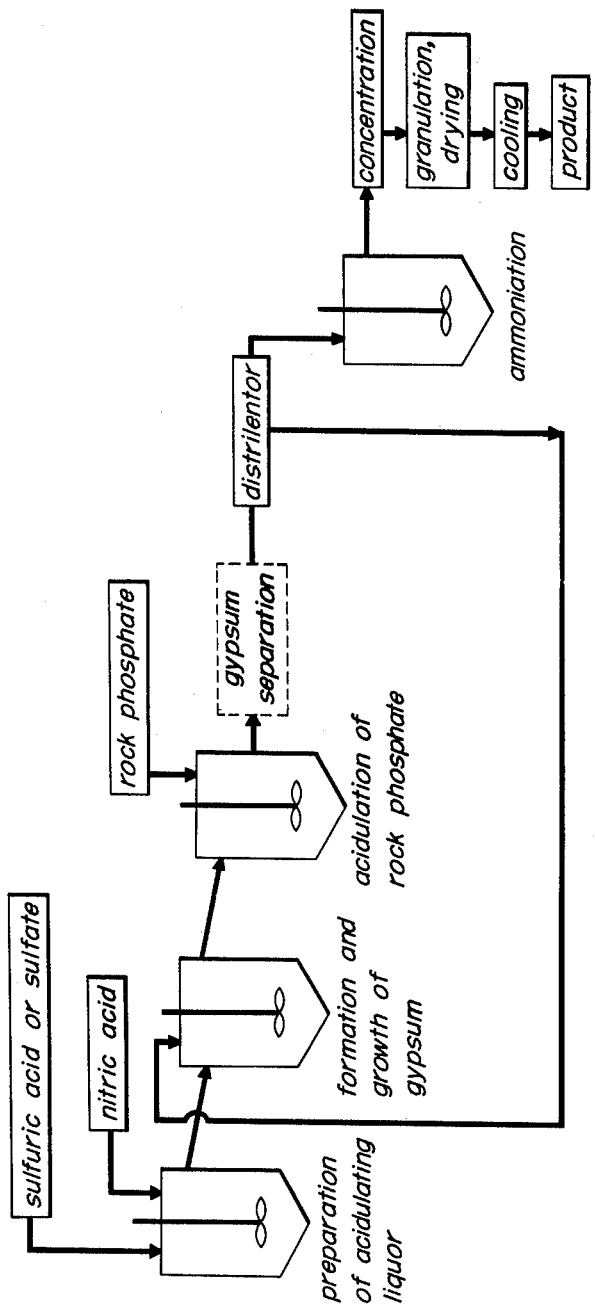

3,241,944
MIXED ACID ACIDULATION OF PHOSPHATE ROCK AND GROWTH OF GYPSUM CRYSTALS
Sadasuke Takeda, Kazuya Tabuchi, Isamu Iwami, and Hisha Kudo, all of Nobeoka-shi, Japan, assignors to Asahi Kasei Kogyo Kabushiki Kaisha, Osaka, Japan, a corporation of Japan
Continuation of applications Ser. No. 142,865 and Ser. No. 142,867, Oct. 4, 1961. This application Nov. 21, 1963, Ser. No. 328,153
Claims priority, application Japan, Oct. 5, 1960, 35/40,258
9 Claims. (Cl. 71—37)

This application is a continuation application of applications, Serial Nos. 142,865 and 142,867, now abandoned.

The present invention is concerned with methods for producing chemical fertilizers. More particularly, it is concerned with the improvement in the production of chemical fertilizers by treating rock phosphate with an acid system of the group consisting of nitric acid-sulfuric acid, nitric acid-sulfate, and nitric acid-sulfuric acid-sulfate to acidulate or decompose rock phosphate, said improvement comprising adding the rock phosphate to the acid system step by step to grow the resulting crystals of gypsum, thereby to decrease the viscosity of the acidulated slurry, which facilitates the producing operation, and facilitates the separation of the formed gypsum, and further to yield highly concentrated chemical fertilizers having total effective components of as high as more than 40% after the separation of the gypsum.

In the production of fertilizers by acidulation of rock phosphate with nitric acid, heretofore, sulfuric acid or a sulfate, besides the nitric acid, is additionally used to meet problems, such as preparation of rock phosphate to the nitrogen value in the final product, form of the phosphate, insolubilization of calcium nitrate which affects the hygroscopicity of the product, and others. Such a conventional method for decomposition of rock phosphate by use of a mixed acid of nitric acid-sulfuric acid has a disadvantage in that the operation is very difficult, since the resulting acidulated slurry has a high viscosity. Although separation of the resulting gypsum from the acidulated slurry to increase the effective components in the fertilizer would occur to those skilled in the art, there have not yet been found methods fulfilling such requirement because of the difficulty in separation of the gypsum.

It is an object of the invention to provide an improved method of the production of chemical fertilizers by acidulation of rock phosphate using a mixed acid system, wherein the viscosity of the acidulated slurry is lowered, thereby facilitating the production operation of the chemical fertilizers, while the removal of the resulting gypsum from the acidulated slurry is greatly simplified.

This and other objects are accomplished by the present method, by incorporating in the production system the step of forming and growing gypsum crystals. This is obtained by introducing an amount of calcium ion which is controlled in quantity to be between 80 to 120% based on the equivalent amount of sulfate ion in the mixed acid.

One method of satisfying the above condition is to divide the addition of rock phosphate being reacted into two stages, wherein in the first stage the amount of the rock phosphate being reacted is controlled so that the amount of calcium contained therein is from 80 ot 120% based on the equivalent amount of sulfate ion in the mixed acid, while in the second stage the remainder of the rock phosphate is added.

Another method is to circulate the acidulated slurry of rock phosphate or the liquor obtained after the separation of the by-produced gypsum back to the initial step of the formation and growth of the gypsum crystals in such an amount that from 80 to 120% of calcium ion based on the equivalent amount of sulfate ion in the mixed acid is fed.

The cause of the increase in viscosity of the acidulated slurry and the difficulty in separation of the resulting gypsum, in the production of chemical fertilizers by decomposition of rock phosphate using nitric acid-sulfuric acid or nitric acid-sulfate in the conventional method, is that the resulting gypsum is in the form of crystalline particles which are fine and minute.

The present invention contemplates lowering the viscosity of the slurry obtained by acidulation of rock phosphate by growing the resulting crystals of gypsum to increase the particle size and decrease the specific surface area, thereby avoiding difficulties in the producing operation while enabling easier separation of the gypsum in an industrial process.

In order to grow the resulting crystals of gypsum a factor of significance is the formation velocity of gypsum, namely the adjustment of calcium ion concentration $[Ca^{++}]$ and sulfate ion concentration $[SO_4^{--}]$ in the reaction mixture, though uniform presence of crystalline nuclei in the reaction mixture in a sufficient amount is, of course, also essential. According to the invention the calcium ion concentration and sulfate ion concentration are adjusted in the process of formation and growth of gypsum, to the condition of $$[Ca^{++}] \doteqdot [SO_4^{--}] \doteqdot 0$$

in the liquor as nearly as possible.

As to the sulfate in the mixed acid, potassium sulfate, ammonium sulfate, magnesium sulfate, manganese sulfate, and other soluble sulfates may be used.

In decomposition of rock phosphate using nitric acid-sulfuric acid or nitric acid-sulfate, the amount of calcium in the rock phosphate employed is stoichiometrically in excess of the amount of sulfate group in the sulfuric acid or the sulfate employed, with the exception of special cases, though depending upon the brand of the product.

In order to adjust the condition of the mother liquor in the process of formation and growth of gypsum crystals to be $[Ca^{++}] \doteqdot [SO_4^{--}] \doteqdot 0$, one method is to divide the rock phosphate and add the same in separate steps of first and second stages of acidulation, while another method is to recirculate a portion of the acidulated slurry to the stage where the gypsum crystals are formed and grown.

The invention will be more concretely illustrated by means of the attached drawing wherein:

FIGURE 1 is a diagrammatic flow chart of a first method according to the invention; and FIGURE 2 is a diagrammatic flow chart of a second method according to the invention.

One method for producing chemical fertilizers according to the present invention, as shown in FIG. 1, comprises preparing the mixed acid, a first acidulation of rock phosphate, a second acidulation of rock phosphate, gypsum separation, ammoniation, and concentration, granulation, and drying. In the first acidulation of the rock phosphate, namely the stage of formation and growth of gypsum, a sufficient amount of rock phosphate to form calcium ion equivalent to the sulfate ion in the mixed acid flowing in is added, thereby to grow crystals of gypsum exceedingly uniformly under an ideal condition of $$[Ca^{++}] \fallingdotseq [SO_4^{--}]$$

namely $[Ca^{++}] \fallingdotseq 0$ and $[SO_4^{--}] \fallingdotseq 0$. In the second acidulation of rock phosphate, the remainder of the rock phosphate is added, the decomposition and extraction of the rock phosphate by nitric and phosphoric acids being effected, independently of the crystals of gypsum. A similar effect is obtained when, instead of the addition of rock phosphate in the first acidulation, a slurry obtained by decomposition of the same amount of rock phosphate with only nitric acid is added.

The present invention is based upon the above conception. Furthermore, a part of the mother liquor in the first process of acidulation of rock phosphate, which contains crystalline nuclei of gypsum, may be circulated into the step of preparation of mixed acid, so as to dilute the concentration of sulfate ion in the mixed acid and to serve for the addition of seeds to grow the crystals. But, there is no substantial difference between the cases of employing and not employing the circulation. There is also no substantial difference between the cases of employing various reaction temperatures. However, a temperature of 30 to 80° C. is practical from the commercial point of view, since the gypsum is not obtained in the form of di-hydrate at the higher temperature, and corrosion of the apparatus and materials, as well as loss of nitric acid, is higher at the higher temperature. The separation of gypsum may be effected either immediately after the first or second acidulation process, but the effective components in the product is more or less increased in the latter case, since the insoluble impurities in rock phosphate is almost completely removed.

A second method according to the present invention, as shown in FIG. 2, comprises the steps of the preparation of the mixed acid, the formation and growth of gypsum crystals, acidulation of rock phosphate, gypsum separation, ammoniation, and concentration, granulation, and drying. In the acidulation of the rock phosphate, the entire amount of rock phosphate is acidulated, and a part of the acidulated slurry or the filtrate of the acidulated slurry, after separation of gypsum, is circulated to the stage for the formation and growth of gypsum crystals in such amount that the amount of calcium ion in the slurry is equivalent to that of sulfate ion introduced, whereby the gypsum crystals are grown under ideal conditions.

In the present invention, as described above, the ideal condition of the mother liquor in the process of formation and growth of gypsum crystals is $$[Ca^{++}] \fallingdotseq [SO_4^{--}] \fallingdotseq 0$$

In carrying out the process practically and commercially, however, the objectives can be reasonably obtained when sufficient rock phosphate is added to provide between 80 and 120% of the calcium ion based upon the equivalent amount of sulfate ion. In other words, though the particle size of gypsum crystals is somewhat smaller in this range than in the ideal case, the filtration is fully possible from an industrial point of view, and the effect of decrease in viscosity of the acidulated slurry is sufficiently achieved. This fact will become apparent from the result of the following experiments.

Example A

In the process of formation and growth of gypsum crystals, in which 144 kg./hr. of a mixed acid (consisting of 12.0% of $H_2SO_4$, 25.0% of $HNO_3$ and 63.0% of $H_2O$) was introduced, the amount of rock phosphate added was varied within such range that the calcium contained in the rock phosphate was within the range between 70% and 135% based upon the sulfate ion, and the rate of filtration in each case was measured, with the following results:

| Amount of rock phosphate added (kg./hr.) | 27.0 | 24.0 | 22.0 | 20.0 | 18.0 | 16.0 | 14.0 |
|---|---|---|---|---|---|---|---|
| (CaO in rock phosphate/CaO equivalent to $H_2SO_4$)×100 | 135 | 120 | 110 | 100 | 90 | 80 | 70 |
| Rate of filtration (l./m.² hr.) | 700 | 1,800 | 2,300 | 3,400 | 3,200 | 2,100 | 600 |

Example B

In the process of formation and growth of gypsum crystals 200 kg./hr. of a mixed acid (consisting of 22.9% of $H_2SO_4$, 4.9% of $HNO_3$ and 31.2% of $H_2O$) was introduced. An amount of a preliminarily prepared circulating filtrate (consisting of 15.1% of $H_3PO_4$, 5.0% of $HNO_3$, 36.4% of $Ca(NO_3)_2$, 38.9% of $H_2O$, and 4.7% of others) was also introduced in a quantity within the range between 70% and 130% based upon the sulfate ion in the mixed acid, and the rate of filtration in each case was measured, with the following results.

| Amount of circulating (ig./hr.) | 2,740 | 2,530 | 2,315 | 2,105 | 1,893 | 1,083 | 1,473 |
|---|---|---|---|---|---|---|---|
| (CaO in circulating filtrate/CaO equivalent to $H_2SO_4$)×100 | 130 | 120 | 110 | 100 | 90 | 80 | 70 |
| Rate of filtration (l./m.² hr.) | 700 | 1,700 | 2,500 | 3,600 | 3,200 | 2,000 | 900 |

The filtration in both of the above examples was carried out under vacuum of −400 mm. Hg with filter cloth of Saran No. 516 (made and sold by Asahi-Dow Co., Ltd.) which is a diagonal cloth having 48 warps per inch of 1800 denier/60 filaments and 25 woofs per inch of 1800 denier/60 filaments. The rate of filtration was measured until the thickness of the filter cake reached 50 mm.

If the process is carried out batchwise and crystals of gypsum is not grown at all, filtration is almost impossible, and the rate of filtration even until thickness of the cake has reached 25 mm. is about 30 l./m.²·hr.

Example C

In the stage of formation and growth of gypsum crystals, in which 96.5 kg./hr. of a mixed acid (consisting of 27.0% of $H_2SO_4$, 20.0% of $HNO_3$ and 53.0% of $H_2O$) was introduced, the amount of rock phosphate was added and was varied within such range that the calcium contained was within the range of 70% and 130% based upon the sulfate ion, and the remainder of the rock phosphate was added to the acid system in the second acidulation process to cause decomposition. After addition of ammonia (ammoniation) to keep the pH of 3.0 to 3.5, the reaction mixture was concentrated to about 10% water content, and viscosity of the resulting slurry was measured, with the following results.

| (CaO in rock phosphate/CaO equivalent to $H_2SO_4$)×100 | 130 | 120 | 100 | 80 | 70 |
|---|---|---|---|---|---|
| Amount of phosphate added in first stage (kg./hr.) | 39.0 | 36.0 | 30.0 | 24.0 | 21.0 |
| Amount of phosphate added in second stage (kg./hr.) | 4.8 | 7.8 | 13.8 | 19.8 | 22.8 |
| Viscosity of acidulated slurry at 20 r.p.m. (poise) | 4.3 | 1.75 | 0.35 | 2.8 | 6.0 |
| Viscosity of acidulated slurry at 2 r.p.m. (poise) | 12.5 | 6.25 | 1.0 | 8.5 | 12.8 |
| Viscosity of the ammoniated slurry at 20 r.p.m. (poise) | 30 | 17.5 | 2.75 | 13.5 | 25 |
| Viscosity of the ammoniated slurry, at 2 r.p.m. (poise) | 100 | 65 | 12.5 | 65 | 95 |
| Viscosity of the concentrated slurry, at 20 r.p.m. (poise) | 200 | 60 | 35 | 60 | 180 |
| Viscosity of the concentrated slurry, at 2 r.p.m. (poise) | 800 | 250 | 100 | 160 | 750 |

The viscosity was measured by use of a rotary viscometer B-type (made by Tokyo Koiki Co.), the measuring temperatures being at 50° C. in the acidulated slurry, at 90° C. in the ammoniated slurry, and at 100° C. in the concentrated slurry.

The decomposition velocity rapidly decreases below the 80% value (CaO in rock phosphate/CaO equivalent to $H_2SO_4 \times 100$), therefore an extremely long retention time is needed for complete dissolution of the rock phosphate, which is not practical from the commercial point of view. Furthermore, the crystals of gypsum are exceedingly fine when the said value is more than 120%, therefore increasing the viscosity to a level which is also not practical from the commercial point of view.

In the method shown in FIG. 1, rock phosphate is added in the amount above specified in the first stage, i.e., the first acidulation of rock phosphate, and reacts with the mixed acid to form gypsum, as follows:

(intermediate reaction)

$$Ca_3(PO_4)_2 + 6HNO_3 \rightarrow 3Ca(NO_3)_2 + 2H_3PO_4$$

or $$Ca_3(PO_4)_2 + 2HNO_3 \rightarrow Ca(H_2PO_4)_2 \times 2Ca(NO_3)_2$$

(final reaction)

$$3Ca(NO_3)_2 + 3H_2SO_4 + 6aq \rightarrow 3(CaSO_4 \cdot 2aq)\downarrow + 6HNO_3$$

or $$3Ca(NO_3)_2 + 3MeSO_4 + 6aq \rightarrow 3(CaSO_4 \cdot 2aq)\downarrow + 3Me(NO_3)_2$$

or $$Ca(H_2PO_4)_2 + H_2SO_4 + 2aq \rightarrow (CaSO_4 \cdot 2aq)\downarrow + 2H_3PO_4$$

NOTE.—MeSO₄ means a sulfate and Me(NO₃)₂ means a nitrate.

Upon the addition of the remainder of rock phosphate in the second stage, i.e. the second process of acidulation of rock phosphate, it reacts with free nitric acid and free phosphoric acid, as follows.

$$Ca_3(PO_4)_2 + 6HNO_3 = 3Ca(NO_3)_2 + 2H_3PO_4$$
$$Ca_3(PO_4)_2 + 4H_3PO_4 = 3Ca(H_2PO_4)_2$$

In the method shown in FIG. 2, rock phosphate and free nitric acid react with each other in the acidulation of rock phosphate as follows.

$$Ca_3(PO_4)_2 + 6HNO_3 = 3Ca(NO_3)_2 + 2H_3PO_4$$

or $$Ca_3(PO_4)_2 + 2HNO_3 = Ca(H_2PO_4)_2 + 2Ca(NO_3)_2$$

While, the circulating acidulated slurry and sulfuric acid or a sulfate react with each other in the stage of formation and growth of gypsum crystals, as follows.

$$Ca(NO_3)_2 + H_2SO_4 + 2aq = (CaSO_4 \cdot 2aq)\downarrow + 2HNO_3$$
$$Ca(NO_3)_2 + MeSO_4 + 2aq = (CaSO_4 \cdot 2aq)\downarrow + Me(NO_3)_2$$

or $$Ca(H_2PO_4)_2 + H_2SO_4 + 2aq = (CaSO_4 \cdot 2aq)\downarrow + 2H_3PO_4$$

NOTE.—MeSO₄ means a sulfate and Me(NO₃)₂ means a nitrate.

The acidulated slurry thus obtained or the filtrate obtained by separation of the resulting gypsum from the acidulated slurry is neutralized by ammonia and is followed by the steps of concentration, granulation, drying, and cooling, to produce chemical fertilizers.

The gypsum crystals formed according to the present invention have a particle size of 30 to 100μ width and 50 to 300μ length, being different from the fine and minute crystals obtained by the conventional method. The acidulated slurry formed has, therefore, a remarkably lower viscosity and a more excellent fluidity, somewhat varying according to the composition of the products, than that obtained by the conventional method with the same composition and condition. Moreover, in the step of gypsum separation, a non-compressible cake having excellent properties of filtration, washing, and dehydration, is formed. The separation can also be well effected, not only by a vacuum filtration, but by a centrifugal separation.

According to the present invention, also, the proportion of effective components in the products can be varied broadly. Thus, the amount of rock phosphate to be added in the first stage or the amount of recirculated acidulated slurry is based upon the amount of water-soluble phosphorous pentoxide content in the product, and the amount of sulfuric acid is, as mentioned above, based upon the amount of rock phosphate added in the first stage or the amount of acidulated slurry recycled. The total amount of rock phosphate is found from the amount of nitric acid, the latter can be deduced from the amount of nitrate-type nitrogen in the product. Thus, the amount and composition of the acidulating mixed acid can be determined. When potassium, magnesium, manganese, and/or other components are required, the mixed acid may be prepared by use of a sulfate or sulfates of these components. Accordingly, the components in the products may freely be varied by variation of amounts of rock phosphate, nitric acid, sulfuric acid and sulfate.

The present invention will further be described with reference to the following examples, which are, however, set forth merely by way of illustration and not by way of limitation. The main components of the starting material and the chemicals employed in the examples are as follows:

(1) Rock phosphate (from Florida, U.S.A., all 2 mm. screen pass): CaO, 49.5%; $P_2O_5$, 34.2%.
(2) Potassium sulfate: $K_2O$, 50.5%; $SO_3$, 44.5%.
(3) Potassium chloride: $K_2O$, 61.3%; Cl, 46.5%.
(4) Nitric acid: $HNO_3$, 60.0%.
(5) Sulfuric acid: $H_2SO_4$, 98.0%.

*Example 1 (gypsum being separated)*

In a step of preparation of mixed acid, 1106 kg./hr. of 60% nitric acid, 412 kg./hr. of 98% sulfuric acid, and 800 kg./hr. of washings back from the step of filtration, namely the step of gypsum separation, are continuously mixed together and sent to the next step of first acidulation of rock phosphate after temperature was controlled at about 30° C. In this step, 470 kg./hr. of rock phosphate which contains the amount of calcium equivalent to the sulfate ion in the mixed acid poured in, is continuously added, to keep the composition of the liquor in $[Ca^{++}] \doteq [SO_4^{--}] \doteq 0$, thereby growing the crystals of gypsum. About 30 min. of retention time suffices when the temperature is 45° C. In the subsequent step of second acidulation of rock phosphate, 418 kg./hr. of the remainder rock phosphate is added. The reaction is completed within 45 min. of retention time at 45° C.

In the conventional method in which crystals of gypsum are not grown, the viscosity of the acidulated slurry in case of forming such a large amount of gypsum is exceedingly high, namely about 50 poise measured by rotary viscometer at 20 r.p.m. at 45° C. While, in the method according to the invention, the viscosity is decreased to 1.0 poise at 2 r.p.m. and 0.4 poise at 20 r.p.m. The resulting acidulate is poured into a centrifugal separator, in which immediate filtration, dehydration and washing can be effected. The cake has a complete non-compressibility, and the water content after the filtration, washing, and dehydration is 8.0 to 10.0%. The separation efficiency of nitric acid and that of phosphoric acid are 99.9% and 99.8% respectively, when 800 kg./hr. of washing water is used.

The amount of gypsum separated is 800 kg./hr., which has the following analytical results.

| | Percent |
|---|---|
| Free water | 8.55 |
| $SO_3$ | 39.43 |
| CaO | 29.35 |
| Total phosphorous pentoxide | 0.20 |
| Water soluble phosphorous pentoxide | 0.04 |
| Nitrate-type nitrogen | 0.03 |
| $SiO_2$ | 2.12 |
| $R_2O_3$ | 0.97 |
| MgO | 0.15 |
| F | 1.08 |

To the filtrate, ammonia is added to keep the final pH 3.5, according to the known process. After concentration, 496 kg./hr. of potassium chloride is added, and the mixture is subjected to the steps of granulation, drying, cooling, etc. to yield about 2 t./hr. of product. The following is one of the analytical results of the product.

| | Percent |
|---|---|
| Moisture | 2.06 |
| Total phosphorous pentoxide | 15.64 |
| Total soluble phosphorous pentoxide | 14.86 |
| Water soluble phosphorous pentoxide | 5.00 |
| Total nitrogen | 15.73 |
| Ammonia-type nitrogen | 8.11 |
| Nitrate-type nitrogen | 7.62 |
| $K_2O$ | 15.68 |
| CaO | 10.79 |
| $SO_3$ | 0.40 |
| Cl | 11.90 |

*Example 2 (gypsum not being separated)*

In the step of preparation of mixed acid, 716 kg./hr. of potassium sulfate and 1933 kg./hr. of 60% nitric acid are continuously mixed together to form a solution, and next sent to the step of first acidulation of rock phosphate. In this step, 450 kg./hr. of rock phosphate which contains the amount of calcium equivalent to the sulfate ion in the potassium sulfate, is continuously added, to grow the crystals of gypsum. The temperature is 45° C., and the retention time is about 30 min. Subsequently in the step of second acidulation of rock phosphate, 468 kg./hr. of the remainder rock phosphate is added. The reaction is completed after about 45 min. of retention time at 50° C. The acidulated slurry thus obtained contains the grown crystals of gypsum having 50 to 300μ length, and has a remarkably lower viscosity than that obtained by the conventional method, namely 1.5 poise at 2 r.p.m. and 0.5 poise at 20 r.p.m. when measured by means of a rotary viscometer. The slurry is then neutralized to pH 3.2 according to the known process, and is subjected to concentration, granulation, cooling, etc., to yield 2.7 t./hr. of product. The ammoniated slurry concentrated to about 10% moisture has viscosity of 110 poise at 2 r.p.m. and 35 poise at 20 r.p.m. at 100° C., while the acidulated slurry containing about 15% moisture obtained by the conventional method in which the crystals of gypsum are not grown, has viscosity of 100 to 150 poise at 20 r.p.m. at 100° C. The analytical results of the product are as follows.

| | Percent |
|---|---|
| Moisture | 1.50 |
| Total phosphorous pentoxide | 10.69 |
| Total soluble phosphorous pentoxide | 9.45 |
| Water soluble phosphorous pentoxide | 3.01 |
| Total nitrogen | 13.90 |
| Ammonia-type nitrogen | 5.44 |
| Nitrate-type nitrogen | 8.43 |
| $K_2O$ | 12.10 |
| CaO | 15.99 |
| $SO_3$ | 10.47 |

*Example 3*

In the step of preparation of mixed acid, 1408 kg./hr. of 60.0% nitric acid, 552 kg./hr. of potassium sulfate, and 218 kg./hr. of 98.0% sulfuric acid, are continuously mixed together, and kept at about 50° C., to completely dissolve the potassium sulfate.

In the step of first acidulation of rock phosphate, 590 kg./hr. of rock phosphate is continuously added. The reaction is completed after about 40 min. retention time at about 50° C., while the crystals of gypsum is grown. In the step of second acidulation, 320 kg./hr. of the remainder rock phosphate is added to be subjected to the similar decomposition. The viscosity of the acidulate is in the same degree as Example 1. Acidulate is continuously poured into a vacuum filter to be subjected to filtration, dehydration, and washing. Water content of the cake after the dehydration is 20 to 25%. The filtrate is ammoniated up to the final pH 2.5 to 3.0 according to the known process, and then subjected to concentration, granulation, drying, and cooling, to yield about 2 t./hr. of product.

One of the analytical values of the product is as follows.

| | Percent |
|---|---|
| Moisture content | 1.05 |
| Total phosphorous pentoxide | 15.51 |
| Total soluble phosphorous pentoxide | 13.96 |
| Water soluble phosphorous pentoxide | 6.86 |
| Total nitrogen | 16.33 |
| Ammonia-type nitrogen | 6.95 |
| Nitrate-type nitrogen | 9.39 |
| $K_2O$ | 13.31 |
| CaO | 9.53 |
| $SO_3$ | 1.96 |

*Example 4*

(A slurry obtained by the decomposition of rock phosphate with nitric acid, being poured in a step of first process of acidulation.)

In a step of preparation of mixed acid, 412 kg./hr. of 98% sulfuric acid and 800 kg./hr. of washing back from the step of filtration, are continuously mixed together and sent to the next step of first acidulation of rock phosphate after temperature was controlled at about 40° C. Rock phosphate, in an amount of 470 kg./hr., which is to be added to the first step of acidulation, is mixed with and acidulated by 1106 kg./hr. of 60% nitric acid before addition, and is transported to a step of first acidulation of rock phosphate to keep the composition of the liquor in $[Ca^{++}] \rightleftharpoons [SO_4^{--}] \rightleftharpoons 0$ thereby growing the crystals of gypsum. Afterwards the same treatment as in Example 1 was carried out, to obtain the similar effects. In the present example, the total phosphorous pentoxide in the gypsum was merely 0.10–0.20% after the gypsum was thoroughly washed with water.

*Example 5*

(An acidulated slurry with suspended gypsum being recycled to the first step of acidulation of rock phosphate.)

In a step of preparation of mixed acid 7.6 kg./hr. of potassium sulfate and 1933 kg./hr. of 60% nitric acid and about 1500 kg./hr. of an acidulated slurry having suspended gypsum recycled from a subsequent step, and continuously mixed together to form a solution.

In the first step of acidulation of rock phosphate, 450 kg./hr. of rock phosphate which contains the amount of calcium equivalent to the sulfate ion in the potassium sulfate poured in, is continuously added, to keep the composition of the liquor in $[Ca^{++}] \rightleftharpoons [SO_4^{--}] \rightleftharpoons 0$ thereby growing the crystals of gypsum. About 40 min. of retention time suffices when the temperature is 45° C.

1500 kg./hr., a part of mixed acid, which was overflowed from the first step of an acidulation of rock phosphate to the second step, were pumped to a step of preparation of mixed acid. Then rock phosphate to be added to the second step was added to the remains as in Example 2. Afterwards, the mixture was treated as in Example 2 and then the same result was obtained.

*Example 6 (gypsum being separated)*

In a step of preparation of mixed acid, 1,079 kg./hr. of 60% nitric acid and 331 kg./hr. of 98% sulfuric acid are continuously mixed together, and cooled to the temperature of about 40° C. In a step of formation and growth of gypsum crystals, 1,485 kg./hr. of a circulating filtrate (consisting of 15.1% of $H_3PO_4$, 5.0% of $HNO_3$, 36.4% of $Ca(NO_3)_2$, 38.9% of $H_2O$, and 4.7% of others) containing calcium equivalent to the $H_2SO_4$, thereby the crystals of gypsum being grown. The temperature is 50° C. and the retention time is 30 min. In a step of acidulation of rock phosphate, 867 kg./hr. of rock phosphate is added, to complete the reaction of 50° C. with the retention time of about 45 min. The acidulated slurry thus obtained contains well grown gypsum crystals and has a lower viscosity, namely 1.0 poise at 2 r.p.m. and 0.5 poise at 20 r.p.m. when measured by a rotary viscometer. It is poured into a centrifugal separator, in which immediate filtration, dehydration, and washing can be effected. The cake has a complete non-compressibility, and the water content after the filtration, washing, and dehydration is 8.0 to 10.0%. The separation efficiency of nitric acid and that of phosphoric acid are 99.7% and 99.6% respectively, when 374 kg./hr. of washing water is used.

The amount of gypsum separated is 650 kg./hr., which has the following analytical results.

| | Percent |
|---|---|
| Free water | 8.55 |
| $SO_3$ | 39.43 |
| CaO | 29.35 |
| Total phosphorous pentoxide | 0.20 |
| Water soluble phosphorous pentoxide | 0.04 |
| Nitrate-type nitrogen | 0.03 |
| $SiO_2$ | 2.12 |
| $R_2O_3$ | 0.97 |
| MgO | 0.15 |
| F | 1.08 |

To the filtrate, ammonia is added to keep the final pH 3.5, according to the known process. After concentration, 485 kg./hr. of potassium chloride is added, and the mixture is subjected to the steps of granulation, drying, cooling, etc., to yield about 2 t./hr. of product. The following is one of the analytical values of the product.

| | Percent |
|---|---|
| Moisture | 1.70 |
| Total phosphorous pentoxide | 14.79 |
| Total soluble phosphorous pentoxide | 13.90 |
| Water soluble phosphorous pentoxide | 3.29 |
| Total nitrogen | 14.72 |
| Ammonia-type nitrogen | 7.54 |
| Nitrate-type nitrogen | 7.18 |
| $K_2O$ | 14.80 |
| CaO | 1.73 |
| Cl | 11.33 |

*Example 7 (gypsum not being separated)*

In the step of preparation of mixed acid, 500 kg./hr. of potassium sulfate and 1,350 kg./hr. of 60% nitric acid are continuously mixed together to form a solution. In the step of acidulation of rock phosphate, total of 640 kg./hr. of rock phosphate is added to be acidulated well at 45° C. with the retention time of about 40 min. A part of the acidulated slurry to be flowed to the ammoniating step is circulated to the step of formation and growth of gypsum crystals, and is reacted with the mixed acid flowed from the step of preparation of mixed acid, thereby the gypsum crystals being grown. The crystals of gypsum are best grown when amount of acidulated slurry to be circulated is about 580 kg./hr., which means the almost equivalent relationship between the soluble [$Ca^{++}$] in the slurry and [$SO_4^{--}$] in the mixed acid. The acidulated slurry thus obtained contains the grown crystals of gypsum having 50 to 300μ length, and has a remarkably lower viscosity than that obtained by the conventional method, namely, 1.0 poise at 2 r.p.m. and 0.5 poise at 20 r.p.m. when measured by means of a rotary viscometer at 45° C., prior to the ammonion step. The slurry is then neutralized to pH 3.2 according to the known process, and is subjected to concentration, granulation, cooling, etc., to yield about 2 t./hr. of product.

The slurry, to which ammonia has been added, has viscosity of 9.5 poise at 2 r.p.m. and 1.4 poise at 20 r.p.m. at 90° C. The ammoniated slurry concentrated to about 8.5% moisture has viscosity of 160 poise at 2 r.p.m. and 50 poise at 20 r.p.m. at 100° C. While the ammoniated liquor containing about 13.0 moisture obtained by the conventional method in which the crystals of gypsum are not grown, has viscosity of 100 to 150 poise at 20 r.p.m. at 100° C. The analytical results of the product is as follows.

| | Percent |
|---|---|
| Moisture | 1.52 |
| Total phosphorous pentoxide | 10.40 |
| Total soluble phosphorous pentoxide | 9.88 |
| Water soluble phosphorous pentoxide | 2.73 |
| Total nitrogen | 14.27 |
| Ammonia-type nitrogen | 5.69 |
| Nitrate-type nitrogen | 8.58 |
| $K_2O$ | 12.02 |
| CaO | 15.08 |
| $SO_3$ | 10.58 |

*Example 8*

In the step of preparation of mixed acid, 1408 kg./hr. of 60% $HNO_3$, 552 kg./hr. of potassium sulfate, and 218 kg./hr. of 98.0% sulfuric acid, are continuously mixed together to dissolve the potassium sulfate at about 50° C. In the step of acidulation total 910 kg./hr. of rock phosphate is added to well decompose at 45° C. with the retention of time of about 50 min. A part of the filtrate to be sent to the ammoniation step is circulated to the step of formation and growth of gypsum crystals preceding the acidulation step, where it is reacted with the mixed acid flow from the step of preparation of mixed acid to grow the gypsum crystals. The gypsum are gypsum are best grown when the circulating filtrate (CaO≒7.7%) is about 3900 kg./hr. at stationary condition, which means the almost equivalent relationship between the soluble [$Ca^{++}$] in the circulating filtrate and [$SO_4^{--}$] in the mixed acid. The temperature of 40° to 60° C. and the retention time of 30 min. suffice for the reaction, and the viscosity of the acidulated slurry is the same as in Example 1. In the step of gypsum separation, the acidulated slurry is poured into a centrifugal separator to be subjected to filtration, dehydration and washing. The moisture content of the gypsum cake is approximately 10%, and the separation efficiency of nitric acid and that of phosphoric acid are 99.8% and 99.6% respectively, when 770 kg./hr. of washing water is used. Thereafter, the filtrate is ammoniated to final pH 2.5 to 3.0, and subjected to concentration, granulation, drying and cooling to yield about 2 t./hr. of product.

One of analytical data of the product is as follows.

| | Percent |
|---|---|
| Moisture | 1.26 |
| Total phosphorous pentoxide | 15.73 |
| Total soluble phosphorous pentoxide | 14.30 |
| Water soluble phosphorous pentoxide | 6.88 |
| Total nitrogen | 16.40 |
| Ammonia-type nitrogen | 7.05 |
| Nitrate-type nitrogen | 9.35 |
| $K_2O$ | 13.17 |
| CaO | 10.23 |
| $SO_3$ | 2.03 |

What is claimed is:
1. In a method of producing a chemical fertilizer in which rock phosphate is acidulated with a mixed acid system to form a slurry, said mixed acid system being selected from the group consisting of nitric acid-sulfuric acid, nitric acid-sulfate, and nitric acid-sulfuric acid-sulfate, the slurry being then neutralized, concentrated, granulated, dried, and cooled to form the final product, an improvement comprising adding a first portion of the rock phosphate in a first stage to the mixed acid in an amount wherein the quantity of rock phosphate contains calcium in an amount between about 80 to 120% of the equivalent amount of sulfate ion in the mixed acid to form a slurry in said first stage wherein gypsum crystals are formed and grown in said slurry, and then adding in a second stage the remainder of the rock phosphate to be treated to said slurry to complete the treatment of the entire quantity of rock phosphate and form a slurry of relatively low viscosity containing grown gypsum crystals, and separating said grown gypsum crystals from said slurry by virtue of their increased particle size.

2. In the method as claimed in claim 1 comprising separating the crystal gypsum from the slurry after the reaction of the first portion of the rock phosphate with the mixed acid system.

3. In the method as claimed in claim 1 comprising separating the crystals of gypsum from the slurry after the addition of the remaining amount of rock phosphate to the slurry in the second stage.

4. In the method as claimed in claim 1 comprising separating the crystals of gypsum from the slurry after the addition of the remaining amount of rock phosphate to the slurry in the second stage, washing the thus separated crystals with a washing liquid and adding the washing liquid to the mixed acid system for treatment of the rock phosphate in the first stage.

5. In the method as claimed in claim 1 wherein said method is continuous and further comprises re-cycling a portion of the slurry obtained after the addition of the first portion of the rock phosphate in the first stage by adding the same to fresh mixed acid for contact with fresh rock phosphate.

6. A method of producing a chemical fertilizer comprising acidulating rock phosphate with a mixed acid system to form a slurry, said mixed acid system being selected from the group consisting of nitric acid-sulfuric acid, nitric acid-sulfate, and nitric acid-sulfuric acid-sulfate, the thus acidulated slurry being then neutralized and finally subjected to concentration, granulation, drying and cooling, the method further comprising forming a continuous treatment process by recycling a portion of the acidulated slurry to fresh mixed acid system in a stage prior to the stage of the acidulation of fresh rock phosphate with said fresh mixed acid system such that the rock phosphate will be acidulated by a mixed acid system containing recirculated slurry, said acidulated slurry being recycled to said mixed acid system in an amount such that a quantity of calcium ion is introduced into said fresh mixed acid system in an amount between 80 and 120% of the equivalent amount of sulfate ion in the mixed acid system to form and grow gypsum crystals, prior to the acidulation of said rock phosphate with the mixed acid system containing recirculated slurry.

7. A method according to claim 6 wherein the gypsum which is formed in the acidulated slurry to be recycled is separated, and the filtrate is recycled.

8. A method according to claim 7 wherein the washings obtained in the separation of gypsum is recycled to the mixed acid.

9. A method according to claim 6 wherein said sulfate is a soluble sulfate selected from the group consisting of potassium sulfate, ammonium sulfate, magnesium sulfate, and manganese sulfate.

References Cited by the Examiner

UNITED STATES PATENTS

| | | | |
|---|---|---|---|
| 1,836,672 | 12/1931 | Larsson | 23—165 |
| 1,944,048 | 1/1934 | Walker et al. | 23—165 |
| 2,106,223 | 1/1938 | Nordengren | 71—40 |
| 2,518,286 | 8/1950 | Constant | 71—37 |
| 2,611,691 | 9/1952 | Tramm | 71—37 |
| 2,939,781 | 6/1960 | Gilliam | 71—64 |
| 2,968,544 | 1/1961 | Zeitz et al. | 71—37 |
| 3,032,407 | 5/1962 | Brandt et al. | 71—37 |
| 3,049,416 | 8/1962 | Brown et al. | 71—37 |

DONALL H. SYLVESTER, *Primary Examiner.*

ANTHONY SCIAMANNA, *Examiner.*

G. W. RUTHERFORD, *Assistant Examiner.*